United States Patent
Barrosso et al.

(10) Patent No.: US 8,387,597 B2
(45) Date of Patent: Mar. 5, 2013

(54) HIGH-VOLTAGE GENERATOR DEVICE

(75) Inventors: Paulo Barrosso, Les Mureaux (FR); Clement Nouvel, Clamart (FR)

(73) Assignee: Renault S.A.S., Boulogne Billancourt (FR)

( * ) Notice: Subject to any disclaimer, the term of this patent is extended or adjusted under 35 U.S.C. 154(b) by 243 days.

(21) Appl. No.: 12/866,592

(22) PCT Filed: Feb. 9, 2009

(86) PCT No.: PCT/FR2009/050206
§ 371 (c)(1),
(2), (4) Date: Dec. 7, 2010

(87) PCT Pub. No.: WO2009/101352
PCT Pub. Date: Aug. 20, 2009

(65) Prior Publication Data
US 2011/0073058 A1    Mar. 31, 2011

(30) Foreign Application Priority Data

Feb. 7, 2008  (FR) ..................... 08 50786

(51) Int. Cl.
*F02P 3/01* (2006.01)
(52) U.S. Cl. ........ 123/598; 123/604; 123/605; 123/606; 123/607; 123/619
(58) Field of Classification Search .................. 123/598, 123/604–607, 619
See application file for complete search history.

(56) References Cited

U.S. PATENT DOCUMENTS

| | | | | |
|---|---|---|---|---|
| 3,623,466 A * | 11/1971 | Palmer | ........................ | 123/604 |
| 4,996,967 A * | 3/1991 | Rosswurm et al. | ........... | 123/598 |
| 5,113,839 A * | 5/1992 | Hartmann et al. | ............ | 123/606 |
| 6,167,875 B1 * | 1/2001 | French et al. | ................ | 123/606 |
| 7,552,724 B2 * | 6/2009 | Yamauchi | ..................... | 123/604 |
| 7,685,999 B2 * | 3/2010 | Toriyama et al. | ............. | 123/620 |
| 2003/0089355 A1* | 5/2003 | Vogel et al. | .................. | 123/620 |
| 2006/0021607 A1* | 2/2006 | Toriyama | ..................... | 123/598 |

FOREIGN PATENT DOCUMENTS

| | | |
|---|---|---|
| DE | 199 24 682 | 12/2000 |
| EP | 1 022 933 | 7/2000 |
| JP | 2003 125586 | 4/2003 |
| WO | 2007 060362 | 5/2007 |

* cited by examiner

*Primary Examiner* — Erick Solis
(74) *Attorney, Agent, or Firm* — Oblon, Spivak, McClelland, Maier & Neustadt, L.L.P.

(57) ABSTRACT

A high-voltage generator device, including an inductive-capacitive resonator capable of producing a high voltage, a mechanism generating a high-frequency control pulse train, a voltage source, a capacitor, and a voltage generator including a switching transistor, the control electrode of which is connected to the output of the mechanism generating the high-frequency control pulse train, the source of the switching transistor being connect to ground, and the drain of the switching transistor being capable of delivering a voltage pulse train to the inductive-capacitive resonator in response to the control pulse train received on the control electrode of the switching transistor. The drain of the switching transistor is connected to the inductive-capacitive resonator via an isolating transformer, the isolating transformer being connected in parallel with a capacitor, the isolating transformer also being connected to the voltage source.

7 Claims, 1 Drawing Sheet

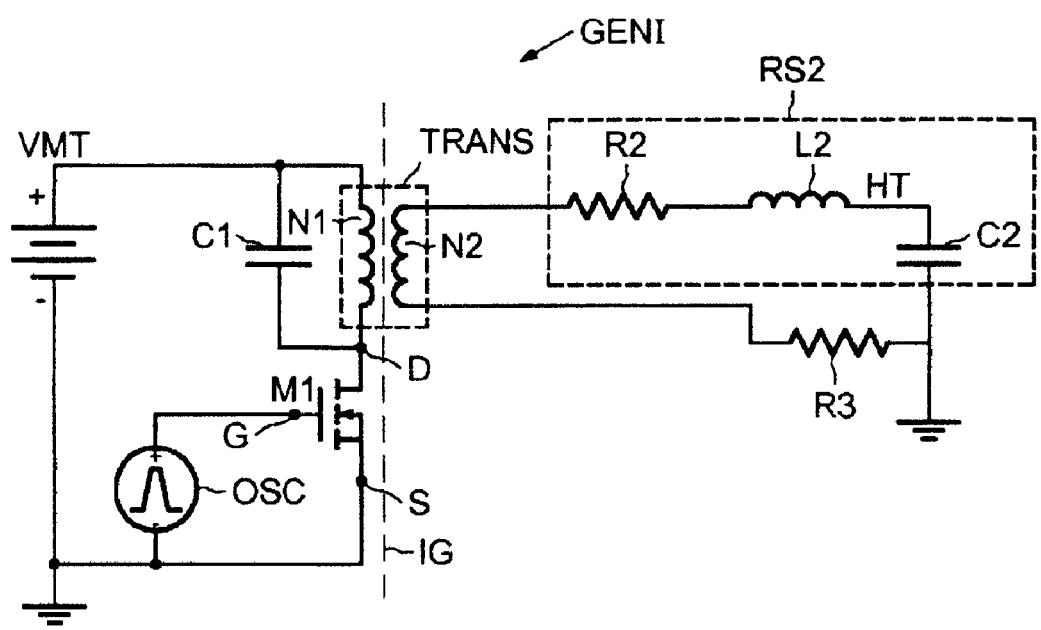

HIGH-VOLTAGE GENERATOR DEVICE

The invention relates to high-voltage generating devices, and more particularly the reduction in the voltage at the output of the switching transistor included in such devices.

The invention applies advantageously but not limitingly to the generation of plasma in a gas, using high-voltage generating devices such as these, and especially the generation of plasma by the electrodes of a spark plug, used for the controlled ignition of an internal combustion engine.

The principle of the resonant spark plug resides in the use of a coil-capacitor resonant assembly, this consisting of two electrodes (one of which comprises the shell) separated by a dielectric material, such as ceramic. This high-frequency resonator is generally called a "coil-spark plug". This resonator is supplied by a voltage generator able to deliver a train of voltage pulses to the resonator in response to a train of high-frequency control pulses received on the control electrode of the switching transistor of the pulsed voltage generator.

More precisely, this pulsed generator comprises, in addition to the switching transistor controlled by the high-frequency train of control pulses, a coil-capacitor assembly linked in parallel and supplied with a medium voltage.

The combination of this pulsed voltage generator and of the series capacitive inductive resonator ("coil-spark plug") constitutes a high-voltage generating device and is commonly called by those skilled in the art a "pseudo class E amplifier".

As indicated above, the control of the switching transistor is performed by a high-frequency voltage (train of control pulses) applied to the gate of the transistor. When the transistor is on, a current flows around the coil while when the transistor is off, the current charges on the one hand the capacitor and on the other hand supplies the coil of the series resonator. The drain potential of the transistor rises. This high voltage periodically supplies the series resonator (coil-spark plug) which, by virtue of a significant quality factor, creates the high voltage capable of triggering sparks. Such generators are described in patent applications FR 03-10766, FR 03-10767 and FR 03-10768.

Pseudo class E amplifiers may also be applied to ultrasound injection devices. Ultrasound excitation of piezoelectric injectors requires the generation of a high voltage of between 200 and 1800 V peak to peak and modulated between 25 and 50 kHz.

Whatever the intended application, a pseudo class E amplifier requires a control transistor that can withstand the required power and voltage levels, considerably reducing the diversity of available components.

An aim of the invention is to propose a solution which makes it possible to reduce the voltage delivered at the output of the power transistor while maintaining a sufficient voltage across the terminals of the series resonator.

According to an aspect of the invention, a high-voltage generating device is defined, comprising a capacitive inductive resonator able to amplify a high voltage, means for generating a train of high-frequency control pulses, a voltage source, a capacitor and a voltage generator comprising a switching transistor whose control electrode is linked to the output of the means for generating the train of high-frequency control pulses, the source of the switching transistor being grounded, the drain of the switching transistor being able to deliver a train of voltage pulses to the capacitive inductive resonator in response to the train of control pulses received on the control electrode of the switching transistor. The drain of the switching transistor is linked to the capacitive inductive resonator by way of an isolation transformer, the isolation transformer being linked in parallel with a capacitor, the isolation transformer being moreover linked to the voltage source.

The primary winding of the isolation transformer may be connected by one terminal to the drain of the control transistor and by another terminal to the voltage source, the primary winding of the isolation transformer being linked in parallel with the capacitor.

The secondary winding of the isolation transformer may be linked by one terminal to the capacitive inductive resonator and by another terminal to a ground, said ground also being linked to the capacitive inductive resonator.

The high-voltage generating device can comprise a galvanic isolation isolating the primary winding and the secondary winding, the components and ground linked to one winding being isolated from the components and ground linked to the other winding by said galvanic isolation.

The ground present in the circuit linked to the secondary winding may be distinct and isolated from the ground present in the circuit linked to the primary winding.

The means for generating the train of control pulses can comprise a fixed-frequency oscillator.

Other advantages and characteristics of the invention will be apparent on examining the detailed description of wholly non-limiting embodiments and the appended drawings in which the single FIGURE illustrates an exemplary electronic embodiment of a device according to the invention.

As illustrated in the single FIGURE, the pulsed voltage generator GENI comprises an assembly consisting of a transformer TRANS and capacitor C1 linked in parallel, as well as a switching transistor M1, formed here of an N-channel MOSFET power transistor, controlled on its gate G by a train of control pulses generated here by a fixed-frequency oscillator OSC. This frequency is a high frequency, typically of the order of a few MHz and greater than 1 MHz. The transformer TRANS comprises a primary winding with N1 turns and a secondary winding with N2 turns. A terminal of the secondary winding is linked to a first terminal of the capacitive inductive resonator RS2 modeled by a resistor R2, an inductor L2 and a capacitor C2. The other terminal of the series resonator RS2 is linked on the one hand to a ground, on the other hand to a resistor R3 linked to the other terminal of the secondary winding. The resistor R1 may be either the modeling of the resistive behavior of the wiring linking the second terminal of the secondary winding to the ground, or a physical component whose role consists in measuring the current flowing in the series resonator RS2. In the latter case, the resistance of this component will be chosen very low relative to the value of R2, in the resonator RS2, so as not to degrade the performance (overvoltage factor) of the resonator RS2 and not to cause excessive heating of the component. A galvanic isolation IG separates the two windings of the transformer TRANS. The galvanic isolation IG also separates on one side the components linked to the primary winding and on the other side the components linked to the secondary winding. The series resonator RS2, also called a capacitive inductive resonator, may be included in a plasma generating spark plug or in a piezoelectric or ultrasonic injector.

The natural frequency of the series resonator formed by the inductor L2 and the capacitor C2 also exhibits a high resonant frequency, for example greater than 1 MHz, with an overvoltage factor of for example between 40 and 200.

The pulsed generator GENI is supplied by a DC voltage source VMT delivering a medium voltage, typically less than 1000 volts.

Moreover, this voltage source VMT preferably exhibits a limited power such that the energy applied between the electrodes of the spark plug is also limited, for example to 300 mJ per ignition and for safety reasons. To generate DC voltages of greater than 12 volts in an automobile application, it is possible to use a 12 volts to Y volts converter, Y being the voltage provided by the power supply VMT. It is thus possible to generate the desired DC voltage level from a battery voltage.

The stability of the DC voltage generated not being a priori a determining criterion, provision may be made by way of example to use a chopped power supply to supply the generator GENI, for its qualities of robustness and simplicity.

When the transistor M1 is on, a current flows around the coil L1. When the transistor M1 is off, the current charges on the one hand the capacitor C1 and supplies the coil L2.

The drain potential D of the transistor M1 rises.

This high voltage, typically of the order of several hundred volts, periodically supplies the series resonator RS2, which by virtue of a significant overvoltage factor, creates the high voltage HT capable of triggering the sparks.

By virtue of the presence of the transformer, the voltage across the terminals of the primary winding, and therefore at the output of the power transistor, may be reduced. Indeed, the transformation ratio M is equal to the ratio of the number of turns of the primary N1 and secondary N2 windings, which is itself equal to the ratio of the voltages of the primary U1 and secondary U2 windings:

$$M=N2/N1=U2/U1$$

Thus, if one wishes to obtain a voltage U1 across the terminals of the series resonator RS2, that is to say across the terminals of the secondary winding N2, it suffices to obtain a voltage U2 across the terminals of the primary winding N1 equal to:

$$U2=U1/M$$

The construction and the technologies employed to produce the transformer are also two essential aspects for the proper operation of the pseudo class E amplifier.

The use of an air-gap transformer is preferable in view of the frequencies involved. Alternative solutions may be used, but the conversion efficiency may then be lower.

The winding is produced preferably with shielded coaxial wire with ground braid so as to limit the high-frequency disturbances.

In the case of the use of the pseudo class E amplifier for ultrasonic injection, the manufacturing constraints may be reduced so as to take account of the lower frequencies involved.

Moreover, it should be noted that the use of a transformer with respect to an inductor generates several appreciable advantages.

Relative to the applications to radiofrequency ignition such as described in French patents FR03-10766, FR03-10767, FR03-10768, the use of a transformer makes it possible to dispense with a series capacitor situated between the output of the pseudo class E amplifier and the charge of the multispark spark plug (BME), as well as with the common-mode filter of Balun type. Moreover, it is possible to integrate a measurement of the ionization current, for example at the level of the resistor R3.

Moreover, the use of an isolation-type transformer makes it possible to remove the DC component of the signal at the input of the series resonator RS2, thus reducing the maximum voltage applied to the cable while preserving the amplitude of the signal. It follows from this that the constraints weighing on the isolation of the cable are not as strict as in the case of a pseudo class E amplifier with no transformer. The range of usable cables is then larger.

In terms of operating safety, a pseudo class E amplifier with transformer makes it possible to isolate the capacitor C1 and the power supply from the connection cables to the series resonator RS2. Thus, a short circuit at the level of these cables or between one of these cables and the ground will not be able to create any electric shock.

Finally, the use of a transformer makes it possible to reduce the electromagnetic disturbances emitted, especially for common-mode current. Indeed, the ground of the series resonator RS2 being decoupled from the ground of the transistor M1, the electromagnetic disturbances emitted during the generation of the ignition spark or during ultrasound generation may not be guided toward the transistor M1 and the control electronics by way of a common ground. This is all the more true when the connection cables comprise a ground braid and a shielding molded in the sheath. For increased isolation, one end or both ends of the ground braid may be connected, the return of the current through R3 being ensured by another conductor.

The invention claimed is:

1. A high-voltage generating device, comprising:
    a capacitive inductive resonator configured to amplify a high voltage;
    means for generating a train of high-frequency control pulses;
    a voltage source;
    a capacitor; and
    a voltage generator comprising a switching transistor whose control electrode is linked to the output of the means for generating the train of high-frequency control pulses, the source of the switching transistor being grounded, the drain of the switching transistor configured to deliver a train of voltage pulses to the capacitive inductive resonator in response to the train of control pulses received on the control electrode of the switching transistor,
    wherein the drain of the switching transistor is linked to the capacitive inductive resonator by an isolation transformer, the isolation transformer being linked in parallel with a capacitor, and the isolation transformer being linked to the voltage source.

2. The high-voltage generating device as claimed in claim 1, in which the primary winding of the isolation transformer is connected by one terminal to the drain of the control transistor and by another terminal to the voltage source, the primary winding of the isolation transformer being linked in parallel with the capacitor.

3. The high-voltage generating device as claimed in claim 1, in which the secondary winding of the isolation transformer is linked by one terminal to the capacitive inductive resonator and by another terminal to a ground, the ground also being linked to the capacitive inductive resonator.

4. The high-voltage generating device as claimed in claim 1, further comprising a galvanic isolation isolating the primary winding and the secondary winding of the isolation transformer, the components and ground linked to one winding being isolated from the components and ground linked to the other winding by the galvanic isolation.

5. The high-voltage generating device as claimed in claim 4, in which the ground present in the circuit linked to the secondary winding is distinct and isolated from the ground present in the circuit linked to the primary winding.

6. The device as claimed in claim 4, in which the means for generating the train of control pulses comprise a fixed-frequency oscillator.

7. The use of a high-voltage generating device as claimed in claim 1, for controlled ignition in an internal combustion engine.

* * * * *